United States Patent
Rusche et al.

(10) Patent No.: US 11,214,471 B2
(45) Date of Patent: Jan. 4, 2022

(54) PALLET TRUCK WITH BRAKE RELEASE AND LOWER BRAKE ZONE DETECTION MECHANISM

(71) Applicant: UniCarriers Americas Corporation, Marengo, IL (US)

(72) Inventors: Mark Rusche, Cary, IL (US); Ryan Giovannini, Marengo, IL (US); Mark McGee, Crystal Lake, IL (US); Vivek Patel, Algonquin, IL (US); Thomas A. Bacheller, Huntley, IL (US)

(73) Assignee: UniCarriers Americas Corporation, Marengo, IL (US)

( * ) Notice: Subject to any disclaimer, the term of this patent is extended or adjusted under 35 U.S.C. 154(b) by 313 days.

(21) Appl. No.: 15/696,854

(22) Filed: Sep. 6, 2017

(65) Prior Publication Data

US 2018/0065837 A1 Mar. 8, 2018

Related U.S. Application Data

(60) Provisional application No. 62/495,608, filed on Sep. 7, 2016.

(51) Int. Cl.
| | | |
|---|---|---|
| *B66F 9/075* | (2006.01) | |
| *B66F 9/065* | (2006.01) | |
| *B62B 5/04* | (2006.01) | |
| *B62B 5/06* | (2006.01) | |
| *B62B 3/06* | (2006.01) | |

(52) U.S. Cl.
CPC ........ *B66F 9/07509* (2013.01); *B62B 3/0612* (2013.01); *B62B 5/04* (2013.01); *B62B 5/0404* (2013.01); *B62B 5/063* (2013.01); *B66F 9/065* (2013.01); *B66F 9/07568* (2013.01)

(58) Field of Classification Search
CPC .. B66F 9/07586; B66F 9/07568; B66F 9/065; B66F 9/0612; B66F 9/07509; B66F 9/075; B62B 5/04; B62B 5/0404; B62B 5/063
See application file for complete search history.

(56) References Cited

U.S. PATENT DOCUMENTS

| | | | | |
|---|---|---|---|---|
| 3,724,586 A | * | 4/1973 | Goodacre | B62B 3/0612 180/274 |
| 2007/0137904 A1 | * | 6/2007 | Rose | B66F 9/20 180/19.1 |
| 2009/0076664 A1 | * | 3/2009 | McCabe | G05D 1/0033 701/2 |

FOREIGN PATENT DOCUMENTS

| | | | | | |
|---|---|---|---|---|---|
| CA | 2475639 A1 | * | 1/2005 | .......... | B62B 3/0612 |
| CN | 2622151 Y | * | 6/2004 | | |
| GB | 670512 A | * | 4/1952 | .......... | B62B 3/0612 |

OTHER PUBLICATIONS

CN2622151Y translation (Year: 2004).*

* cited by examiner

*Primary Examiner* — Tyrone V Hall, Jr.
*Assistant Examiner* — Abbie E Quann
(74) *Attorney, Agent, or Firm* — Norton Rose Fulbright US LLP

(57) ABSTRACT

A pallet truck has a brake release mechanism. The pallet truck has a break release mechanism operably coupled to a brake for stopping rotation of a drive wheel. The brake release mechanism includes a brake release sensor and a profile feature that is detectable by the brake release sensor. The profile feature is fixedly coupled to a pivot shaft of a tiller arm of a tiller, and configured to rotate with the pivot shaft as the tiller arm is pivoted. The brake release sensor is positioned adjacent to the pivot shaft and configured to (Continued)

output a signal that causes the brake to release when the profile feature is detected.

23 Claims, 8 Drawing Sheets

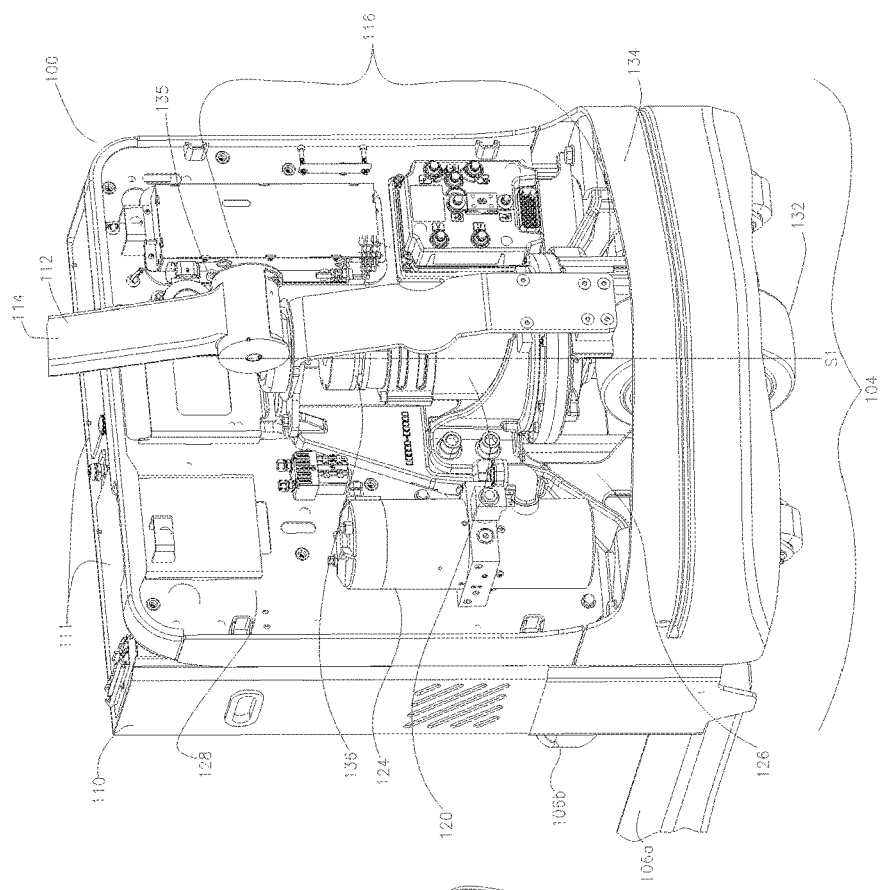

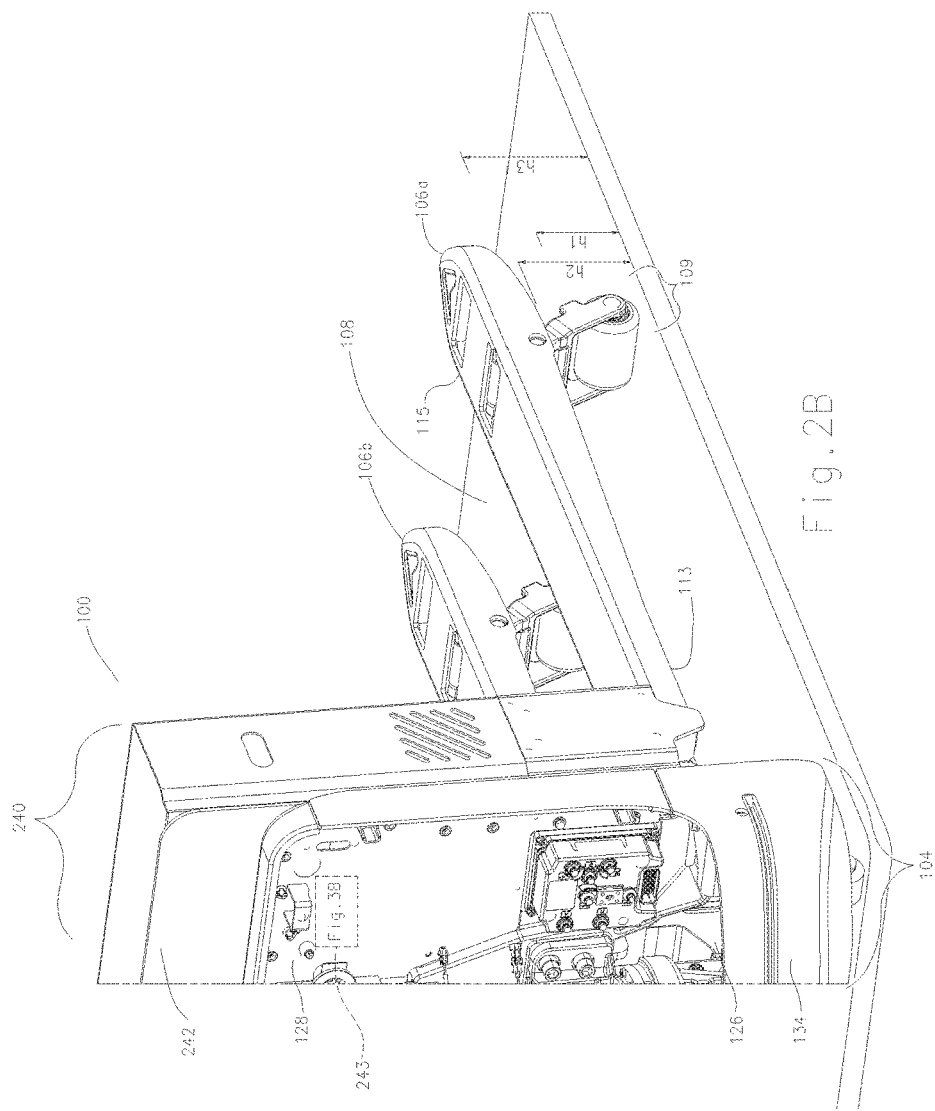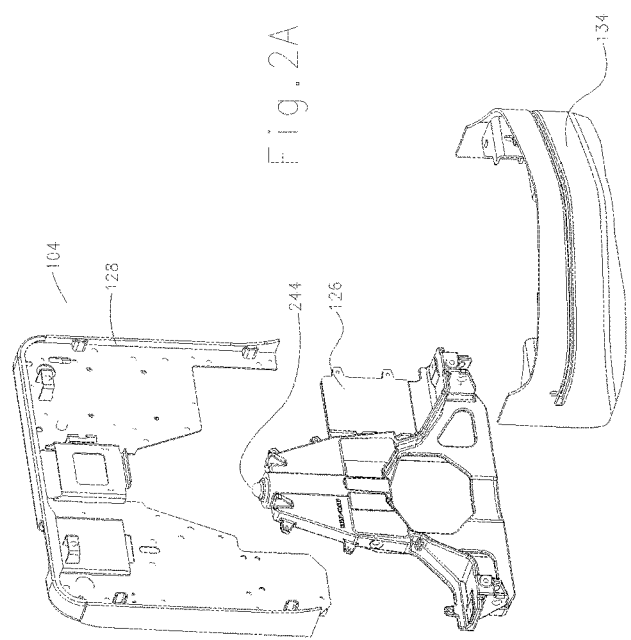

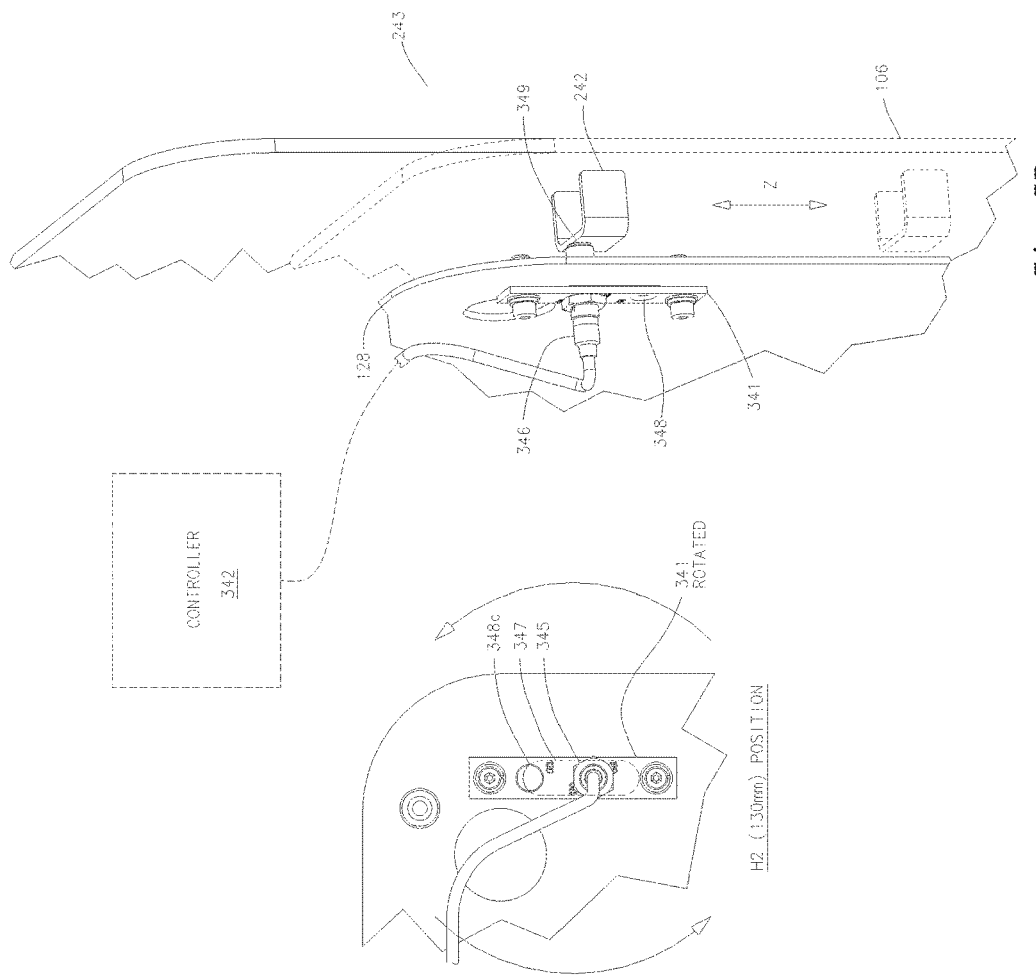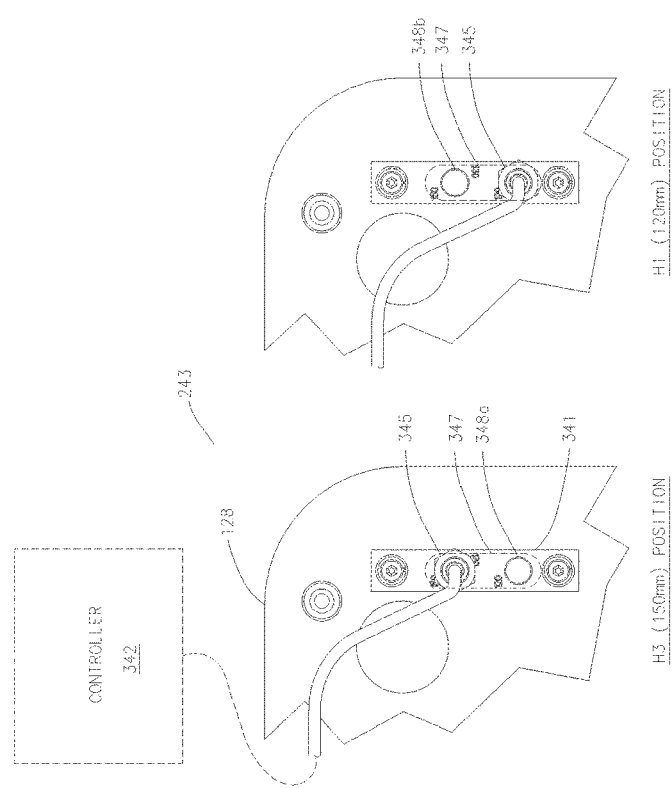
Fig. 3A
Fig. 3B

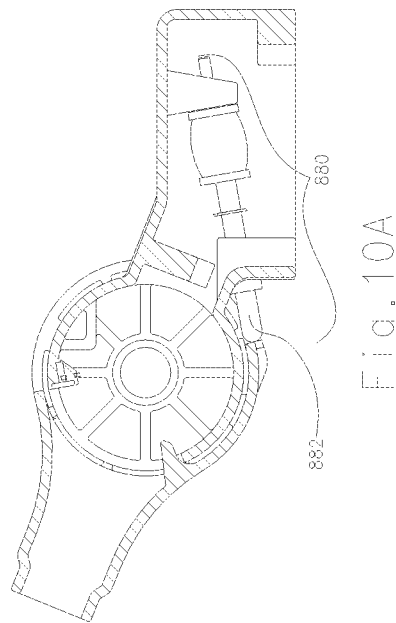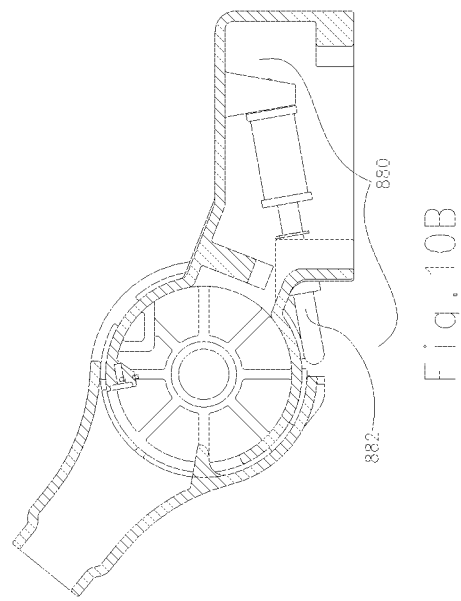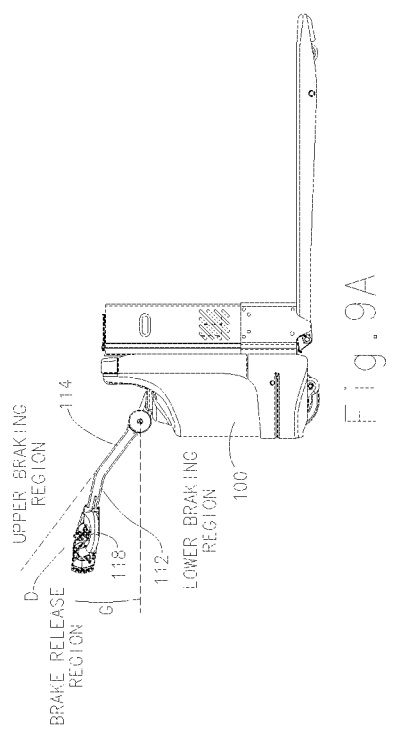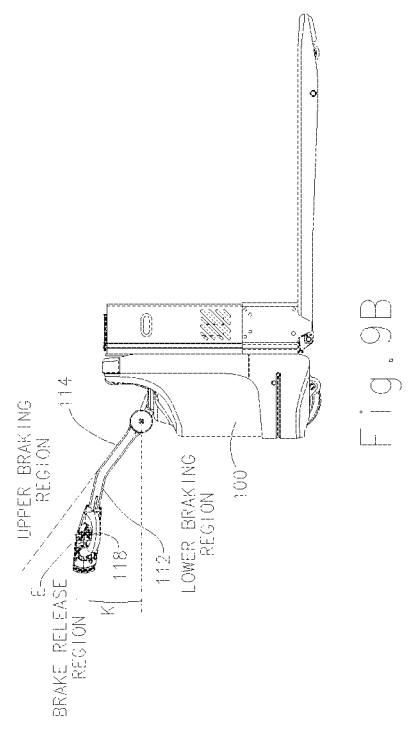

PALLET TRUCK WITH BRAKE RELEASE AND LOWER BRAKE ZONE DETECTION MECHANISM

PRIORITY CLAIM

This application claims priority from U.S. Provisional Patent Application No. 62/495,608, filed on Sep. 7, 2016, the entirety of which is hereby incorporated by reference herein.

TECHNICAL FIELD

The following disclosure relates generally to pallet trucks, and more particularly, to brake release mechanisms and lower brake zone detection mechanisms for pallet trucks.

BACKGROUND

A pallet truck is a type of vehicle used to lift and move pallets onto which heavy or light objects are placed. The forks of the jack are designed to slide below the deck boards of the pallet. Pallet trucks operate in a manner similar to a forklift, but are smaller in size and have a maximum lift height of typically less than 6 inches. A pallet truck can move and organize pallets inside a trailer or other area where there is no forklift access.

BRIEF DESCRIPTION OF THE DRAWINGS

FIG. 1A is a side view, and FIG. 1B is a front isometric view illustrating a pallet truck configured in accordance with an embodiment of the present technology.

FIG. 2A is an exploded isometric view of a lift assembly of the pallet truck, FIG. 2B is a front isometric view of a lift structure of the lift assembly.

FIGS. 3A and 3B are partially schematic diagrams of a lift height detector of the pallet truck.

FIGS. 9A and 9B are side views of the pallet truck showing the handle of the tiller arm in various positions.

FIGS. 10A and 10B are cross-section side views showing a corresponding orientation of the feedback mechanism when the handle is in the corresponding positions of FIGS. 9A and 9B, respectively.

DETAILED DESCRIPTION

Figure 4B:
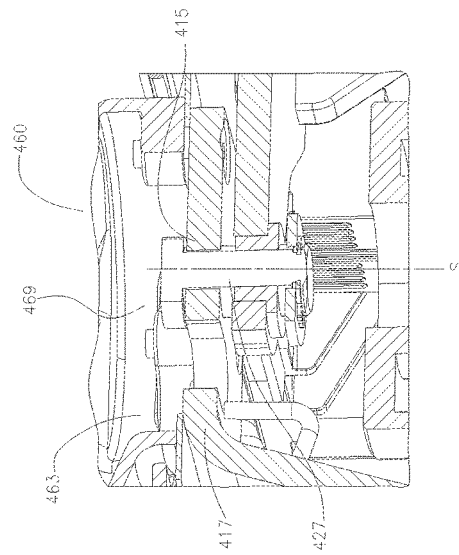
FIG. 4B is a cross-sectional, isometric view of a mounting structure forming a pivot joint with the tiller arm.

A pallet truck is steered by a "tiller" that is connected to a main wheel or a pair of central wheels below the tiller. The forks of a pallet truck are lifted by a lift frame operably coupled to a single- or double-acting hydraulic lift cylinder. In hand-powered pallet trucks, the tiller can act as a pump handle that can be vertically manipulated for raising the forks of the truck.

In powered pallet trucks, the truck includes a motor connected to the main drive wheel of the forklift. The tiller in such pallet trucks can include a separate lever or switch connected to the hydraulics for lifting the fork, while vertical manipulation of the tiller is used to control a brake that stops rotation of the drive wheel. The brake releases when the operator lowers the tiller arm. The brake automatically closes to apply a braking force when the operator returns the arm to an upright position.

In some instances, when a user is operating a pallet truck, the user will unintentionally move the tiller into a lower brake zone which will cause the pallet truck to abruptly stop without notice. There is a need for pallet trucks with a warning mechanism to prevent users from moving the tiller into the lower brake zone causing the truck to stop involuntarily.

This disclosure describes various embodiments of pallet forks and braking mechanisms and other components of pallet trucks. As described below, a pallet truck configured in accordance with an embodiment of the present technology can include a brake release mechanism operably coupled to a brake for stopping rotation of a drive wheel. The brake release mechanism includes a brake release sensor and a profile feature that is detectable by the brake release sensor. The profile feature is fixedly coupled to a pivot shaft of a tiller arm of a tiller, and configured to rotate with the pivot shaft as the tiller arm is pivoted. The brake release sensor is positioned adjacent to the pivot shaft and configured to output a signal that causes the brake to release when the profile feature is detected. In additional or alternate embodiments, the pallet truck can include a feedback mechanism having a biasing member operably coupled to the tiller. The feedback mechanism is configured to increase rotational resistance of the tiller arm that alerts the operator when the pallet truck is on the verge of applying the brake.

In various embodiments, the pallet truck can also be referred to as a pallet jack, an electric pallet truck, a power jack, a walkie, or the like. In some embodiments, certain aspects of the technology, such as the non-welded fork structure, can be employed in vehicles other than pallet trucks, such as forklifts, having forks configured to lift and transport objects.

Many of the details and features shown in the Figures are merely illustrative of particular embodiments of the technology. Accordingly, other embodiments can have other details and features without departing from the spirit and scope of the present technology. In addition, those of ordinary skill in the art will understand that further embodiments can be practiced without several of the details described below. Furthermore, various embodiments of the technology can include structures other than those illustrated in the Figures and are expressly not limited to the structures shown in the Figures. Moreover, various elements and features illustrated in the Figures may not be shown to scale.

FIG. 1A is a side view, and FIG. 1B is a front isometric view illustrating a pallet truck 100 configured in accordance with an embodiment of the present technology. In FIG. 1B, an upper cover 102 (FIG. 1A) of the pallet truck 100 has been removed to show components of the truck 100 located beneath the cover 102. Referring to FIG. 1A, the pallet truck 100 includes a lift assembly 104, a battery housing 110 proximate the lift assembly 104, and first fork and second forks assemblies 106a and 106b (collectively "forks 106") extending laterally outward from the lift assembly 104. Each fork 106 includes a proximal end portion 113 adjacent the battery housing 110, and an outboard end portion 115 connected to a load roller assembly 109. In the example of FIG. 1A, each load roller assembly 109 is in a retracted position, and each fork 106 is in a lowered position relative to a floor surface 108. The battery housing 110 includes a compartment 111 (FIG. 1B) that contains batteries (e.g., rechargeable battery packs; not shown) for powering the pallet truck 100.

The pallet truck 100 further includes a tiller 112 having a tiller arm 114 that is articulated to a steering assembly 116 (FIG. 1B). The tiller arm 114 is coupled to a handle region 118 ("handle 118") having various user controls 122, such as a safety reverse button and lift, speed, and direction control switches/levers. Referring to FIG. 1B, the user controls 122 (FIG. 1A) are coupled to a motor 120, a hydraulic pump 124, and other electrical and mechanical components (not labeled), e.g., valves, solenoids, controllers, sensors, etc. The motor 120 and the hydraulic pump 124 are mounted to lower and upper frame sections 126 and 128, respectively, of the lift assembly 104. The upper frame section 128 can be attached to the lower frame section 126 by a plurality of fasteners (not labeled), such as bolts, and corresponding locking features, such as threaded through-holes or lock nuts. The frame sections 126 and 128 can be formed from metal. For example, the lower frame section 126 can be formed from cast metal (e.g., an iron casting). The upper frame section 128 can be formed from steel (e.g., welded steel).

The motor 120 is operably coupled to a drive wheel 132 which is steered by the steering assembly 116 via the tiller 112. The drive wheel 132 is partially covered by a lower cover, or bumper 134, connected to opposite sides of the lower frame section 126. The bumper 134 can be formed from metal, such as pressed steel, aluminum, or other durable materials (e.g., structural plastic).

The steering assembly 116 is rotated by the tiller 112 about a steering axis $S_1$. The tiller arm 114 is operably coupled to a brake 136 connected to the drive shaft of the motor 120. The brake 136 can be for example, a power-off, friction brake. As described in greater detail below, the tiller arm 114 pivots in a generally vertical direction about a pivot joint 135. Although not described in detail for purposes of clarity, the pallet truck 100 can include other mechanical and electrical components. For example, in some embodiments, the pallet truck 100 can include fork assemblies and other structural components described in U.S. patent application Ser. No. 15/696,777, filed Sep. 6, 2017, and titled "Pallet Truck with Pressed Fork Structure," which is incorporated herein in its entirety by reference.

FIG. 2A is an exploded isometric view of the lift assembly 104 showing the lower and upper frame sections 126 and 128 in more detail, and FIG. 2B is a front isometric view of a lift structure 240 of the lift assembly 104. Referring to FIG. 2B, the lift structure 240 includes a lift plate 242 coupled to a central lift cylinder 244 (FIG. 2A) that is integrally formed with the lower frame section 126 of the lift assembly 104. The lift plate 242 is coupled to the proximal end portion 113 of each fork 106. A height adjustment mechanism 243 ("height adjuster 243"; shown schematically) is operably coupled to the upper frame section 128 and the lift structure 240. In operation, the lift structure 240 is configured to lift each fork's proximal end portion 113, and the load roller assembly 109 is configured to concurrently lift the outboard end portion 115. The lift structure 240 and load roller assembly 109 lift the forks 106 to one of a plurality of pre-determined lift heights $h_1$, $h_2$, and $h_3$ set by the height adjuster 243, as described below.

FIG. 3A is a partially schematic diagram showing the height adjustor 243 in a first state when the forks 106 are in the lowered state shown in FIG. 1A, and FIG. 3B is a partially schematic diagram showing the height adjuster 243 when the forks 106 are in the raised state shown in FIG. 2B. Referring to FIGS. 3A and 3B together, the height adjuster 243 includes an adjustable member, such as an adjustable plate 341, and a lift height sensor 345 fixedly coupled to the adjustable plate 341. The adjustable plate 341 is adjustably coupled to a portion of the upper frame section 128. The adjustable plate 341 includes a plurality of height-selection apertures 348 (identified individually as first through third apertures 348a-c) into which a proximity switch 346 can be selectively inserted. The proximity switch 346 is received into a corresponding hole 347 (not shown) in the upper frame section 128 located on the opposite side of the adjustable plate 341. The height-selection apertures 348 are spaced apart from one another on the adjustable plate 341 by a distance corresponding to the predetermined lift heights $h_1$-$h_3$ shown in FIG. 2B.

The lift height sensor 345 is positioned adjacent to a portion of the lift plate 242 that moves generally vertically with the forks 106 (FIG. 1A) as they are raised and lowered during operation, as shown by double-sided arrow Z. The lift height profile feature 349 can include a vertical edge and/or a horizontal edge that is detectable by the lift height sensor 345 when in its detection range. In the illustrate example, the lift height profile feature 349 can include one or more integral edges formed in the lift plate 242. In other embodiments, the lift height profile feature 349 can be part of a separate structure that is attached to the lift plate 242, other portions of the lift structure 240 (FIG. 2B), and/or the battery housing 110 (FIG. 1A). The lift height sensor 345 can include a non-contact sensor (e.g., a proximity sensor), such as a photoelectric, inductive, capacitive, and/or ultrasonic sensor.

In operation, when the lift height sensor 345 detects the lift height profile feature 349, the lift height sensor 345 provides a signal to a controller 342 (shown schematically) that stops further vertical lift of the forks 106 (FIG. 1A) in the upward direction, such as by de-energizing the hydraulic pump 124 (FIG. 1B) connected to the lift cylinder 244 (FIG. 2A). In one aspect of the technology, the lift height of the forks 106 can be selected by adjusting the proximity switch 346 which is located within adjustable plate 341. For example, when the proximity switch 346 is inserted into the first aperture 348a and the underlying hole 347, the adjustable plate 341 will position the lift height sensor 345 in a relatively low orientation, which, in turn, will reduce the lift height compared to when the proximity switch 346 is inserted into one of the other apertures 348. In some embodiments, the height-selection apertures 348a-c can correspond to lift heights of about 12 cm, 13 cm, and 15 cm, respectively. In other embodiments, one or more of the height-selection apertures 348 can correspond to a different lift height and/or the adjustable plate 341 can include additional or fewer lift height apertures.

Figure 4A:
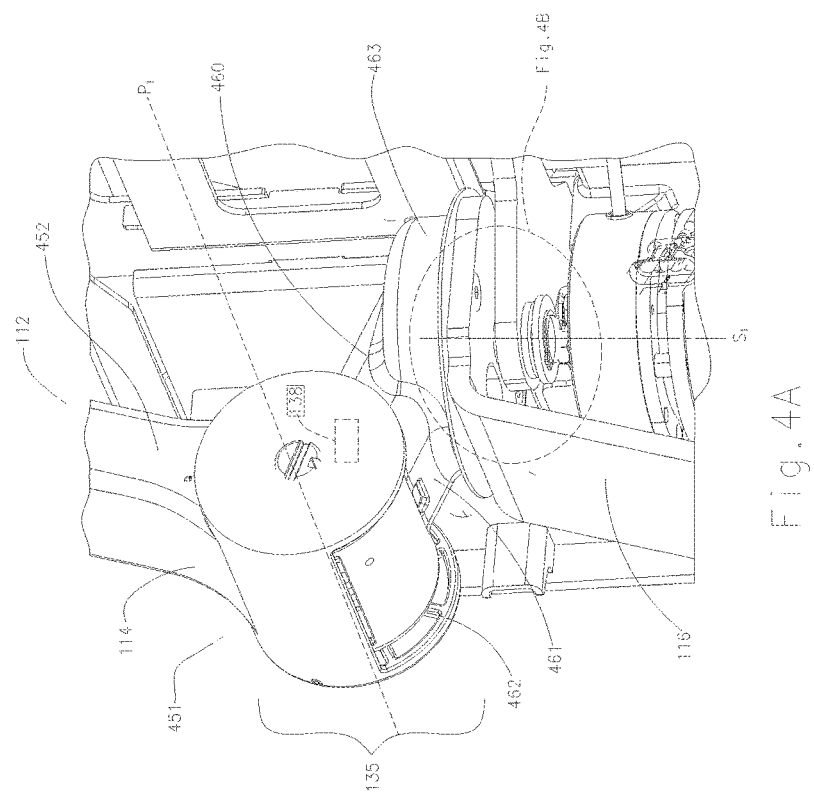
FIG. 4A is an enlarged, isometric view of a tiller arm of the pallet truck.

FIG. 4A is an enlarged, isometric view of a portion of the tiller 112 showing the pivot joint 135 in further detail, and FIG. 4B is a cross-sectional, isometric view showing a mounting structure 460 that is operably coupled to the tiller arm 114 (FIG. 3A). Referring first to FIG. 4A, the tiller arm 114 includes a generally hollow body 452 that terminates at a first region 451. The mounting structure 460 includes a generally hollow body 461 having a base 463 that is attached to the steering assembly 116. The body 461 of the mounting structure 460 terminates in a second region 462 that is pivotally coupled to the first region 451 of the tiller arm 114. The tiller arm 114 is configured to pivot relative to the second region 462 about a pivot axis $P_1$ that is generally perpendicular to the steering axis $S_1$. The tiller arm 114 is configured to rotate with the mounting structure 460 about the steering axis $S_1$. The tiller arm 114 and the mounting structure 460 house a brake release mechanism 138 (shown schematically) within the first and second regions 451 and 462 that is configured to detect when the brake 136 (FIG. 1B) is to be released based on the vertical orientation of the tiller arm 114, as described below.

Referring to FIG. 4B, the base 463 of the mounting structure 460 is attached to the steering assembly 116 via, e.g., fasteners (not labeled), such as bolts, and corresponding locking features, such as lock nuts or threaded through-holes in the steering structure 116. An upper portion 417 of the steering assembly 116 is rotatably coupled to the upper frame section 128 (FIG. 1B) via a shaft 427. The shaft 427 extends through an opening 415 in the upper portion 417 and at least partially into a cavity 469 within the mounting structure 460.

Figure 5A:
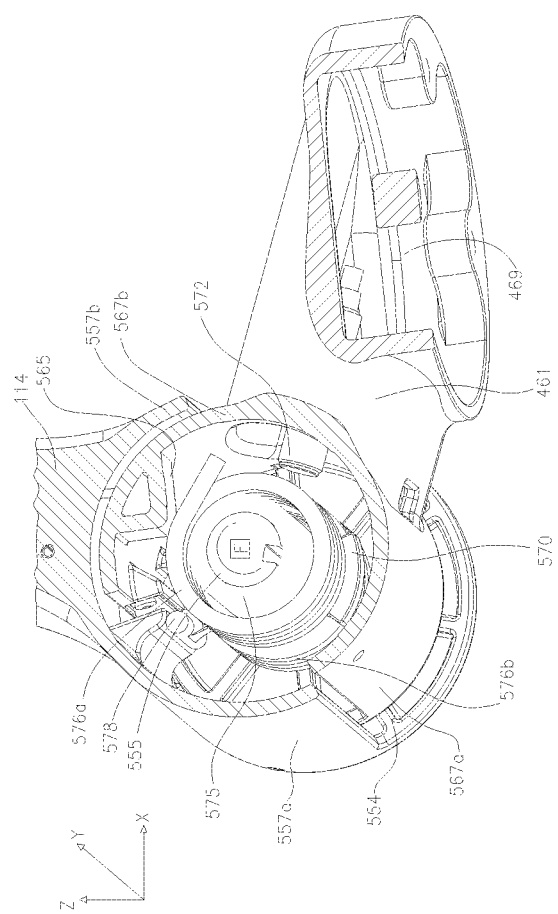
FIG. 5A is partial cross-sectional view of the tiller arm.
Figure 5B:
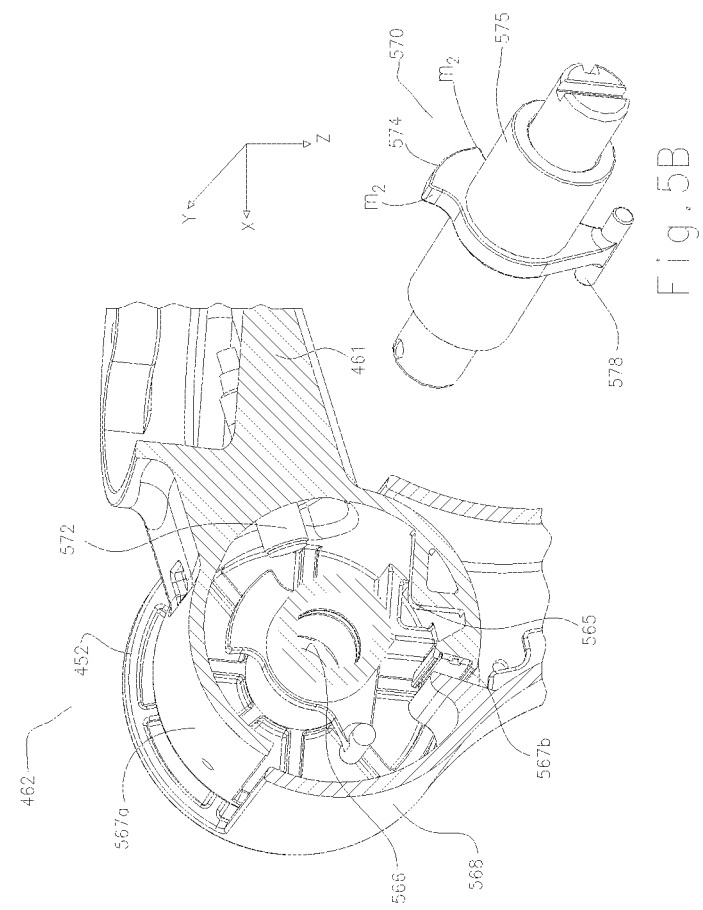
FIG. 5B is a partially exploded, isometric view the tiller arm showing a brake release mechanism configured in accordance with an embodiment of the present technology.

FIG. 5A is partial cross-sectional view of the first region 451 of the tiller arm 114, and FIG. 5B is a partially exploded, isometric view of the second region 462 of the mounting structure showing components of the brake release mechanism 138 (FIG. 4A) configured in accordance with an embodiment of the present technology. Referring first to FIG. 5A, the first region 451 of the tiller arm 114 includes a generally flat outer wall 554, an integral pivot shaft 555 projecting generally perpendicularly (e.g., in the Y-axis direction) from the center of the outer wall 554, and exterior sidewalls 557 (identified individually as a first exterior sidewall 557a and a second exterior sidewall 557b) that are concentric with the pivot shaft 555. The outer wall 554 has a generally circular shape, and the exterior sidewalls 557 project from perimeter of the outer wall 554 in generally the same direction as the pivot shaft 555. The exterior sidewalls 557 are curved and partially define a "C"-shaped enclosure with the outer wall 554.

Referring to FIG. 5B, the second region 462 of the mounting structure 460 has a generally flat outer wall 554 and inner sidewalls 567 (identified individually as a first inner sidewall 567a and a second inner sidewall 567b) that project generally toward (e.g., in the −Y-axis direction) the first region 451 of the tiller arm 114. The outer wall 554 includes an inner surface 568 and a bushing 566 formed in the inner surface 568 that receives an end portion of the pivot shaft 555 (FIG. 5A). Each of the inner sidewalls 567 is adjacent to and inset from a corresponding one of the exterior sidewalls 557 (FIG. 5A). The inner sidewalls 567 are curved and define a "C"-shaped enclosure with the outer wall 554.

Referring to FIGS. 5A and 5B together, the brake release mechanism 138 (FIG. 4A) includes a brake profile feature 570 (e.g., a raised ridge) coupled to the pivot shaft 555, and a brake release sensor 572 (e.g., a proximity sensor), positioned adjacent to the pivot shaft. The brake release sensor 572 is attached to the body 461 of the mounting structure 460 within the cavity 469. The brake release sensor 572 extends into the enclosure of the pivot joint 135 (FIG. 1B), and is positioned adjacent to the pivot shaft 555. The brake release sensor 572 can include, for example, a photoelectric, inductive, capacitive, and/or ultrasonic sensor. In various embodiments, housing the brake release sensor 572 and the brake profile feature 570 within the enclosure of the pivot joint 135 can prevent tampering with the brake release mechanism 438.

The brake profile feature 570 is integrally formed on a cam member 575 that is fixedly coupled (e.g., keyed) to the pivot shaft 555. The cam member 575 can be biasedly coupled to the mounting structure 460 by biasing members, such as torsional springs 576 (identified individually as a first torsional spring 576a and a second torsional spring 576b). Each of the torsional springs 576 includes a first end portion that engages an integral retention feature 578 on the cam member 575, and a second end portion that engage an integral retention feature 565 on the second inner sidewall 567b of the mounting structure 460. In use, the torsional springs 576 provide a rotational force in the direction of arrow F (FIG. 5A). In various embodiments, the torsional springs 576 can compensate for the weight of the tiller arm 114 so that it can be comfortably carried by the operator during use. In one aspect of the technology, the use of two torsional springs can increases the spring force of the pivot joint relative to the spring force of conventional tiller joints having a single torsional spring.

Referring to FIG. 5B, the brake profile feature 570 has an edge portion 574 extending along an arcuate path between a start position $m_1$ and a stop position $m_2$. In operation, the brake profile feature 570 rotates with the pivot shaft 555 when the tiller arm 114 is pivoted (e.g., when the operator raises or lowers the tiller handle 118; FIG. 1A). As described below, when the edge portion 574 is detected by the brake release sensor 572, the brake release sensor 572 produces a signal (e.g., to the controller 342; FIG. 3A) for releasing the brake 136 (FIG. 1B).

Figure 7A:
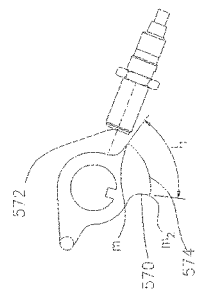
FIGS. 7A-7C are views showing a corresponding orientation of the brake release mechanism when the handle is in the corresponding positions of FIGS. 6A-6C, respectively.
Figure 7B:
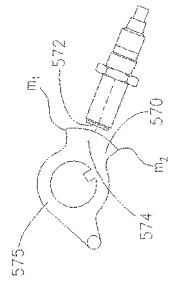
Figure 7C:
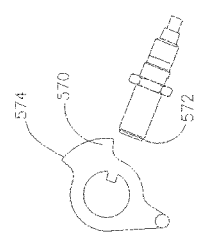
Figure 6A:
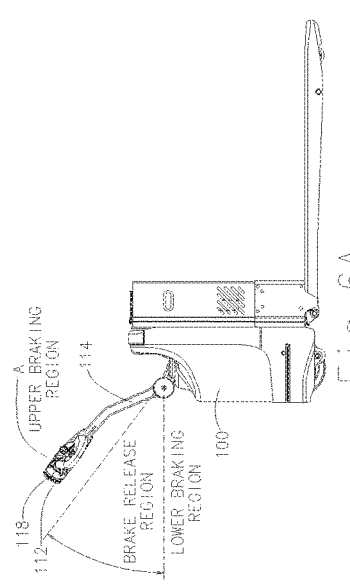
FIGS. 6A-6C are side views of the pallet truck showing a handle of the tiller in various positions.
Figure 6B:
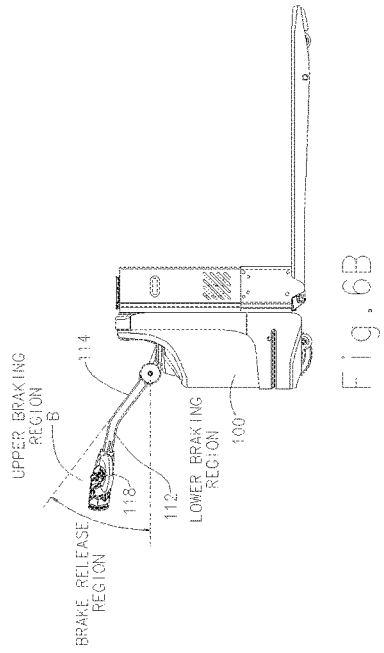
Figure 6C:
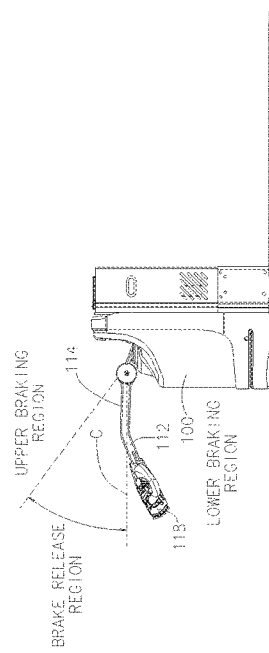

FIGS. 6A-6C are side views of the tiller 112 and a portion of the pallet truck 100 showing the tiller arm 114 and the handle 118 oriented in positions A-C, respectively, and FIGS. 7A-7C are enlarged view showing a corresponding orientation of the brake profile feature 570 when the tiller arm 114 is at the positions A-C, respectively. Referring to FIG. 6A, in position A, the tiller arm 114 is oriented generally upright and located within an upper braking region. Referring to FIG. 7A, the brake profile feature 570 is rotated away from the brake release sensor 572 when the tiller arm 114 is in the upper braking region. As a result, the brake release sensor 572 does not detect the edge portion 574 of the brake profile feature 570, and the brake release sensor 572 does not transmit a signal to release the brake 136 (FIG. 1B).

Referring to FIG. 6B, in position B, the tiller arm 114 is oriented within a brake release region defined by the brake profile feature 570. Referring to FIG. 7B, the brake profile feature 570 has been rotated toward the brake release sensor 572 which detects the edge portion 574. In response to detecting the edge portion 574, the brake release sensor 572 produces a signal that cause the brake 136 to release. This, in turn, allows an operator holding the tiller handle 118 to drive the pallet truck 100.

In one aspect of the technology, the brake profile feature 570 can be manufactured to have a desired start position $m_1$, stop position $m_2$, and/or span length $l_1$ (FIG. 7A). Increasing the span length $l_1$ will increase the span of the brake release range, while decreasing the span length $l_1$ will decrease the span of the brake release range. Changing the start and/or the stop positions will change the relative locations at which the brake is released when raising and lowering the handle 118 of the tiller 112. In some embodiments, the cam member 575 coupled to the brake profile feature 570 can be interchanged with a different cam member having a different brake profile feature (having, e.g., a different span length, start position, and/or stop position) configured to achieve a desired brake release range.

Referring to FIG. 6C, in position C, the tiller arm 114 is oriented generally laterally and located within a lower braking region. Referring to FIG. 7C, the brake profile feature 570 is rotated away from the brake release sensor 572 when the tiller arm 114 is in the lower braking region. As a result, the brake release sensor 572 does not detect the edge portion 574 of the brake profile feature 570, and the pallet truck applies the brake 136 to stop rotation of the motor 120 (FIG. 1B) and further movement of the truck. Applying the brake 136 in the lower braking region can prevent the pallet truck 100 from driving away from the operator, such as if the operator inadvertently lets go of the handle 118. If the operator inadvertently lets go of the handle the tiller arm 114 returns to vertical (to upper brake zone) automatically via the torsion springs 576.

Figure 8:
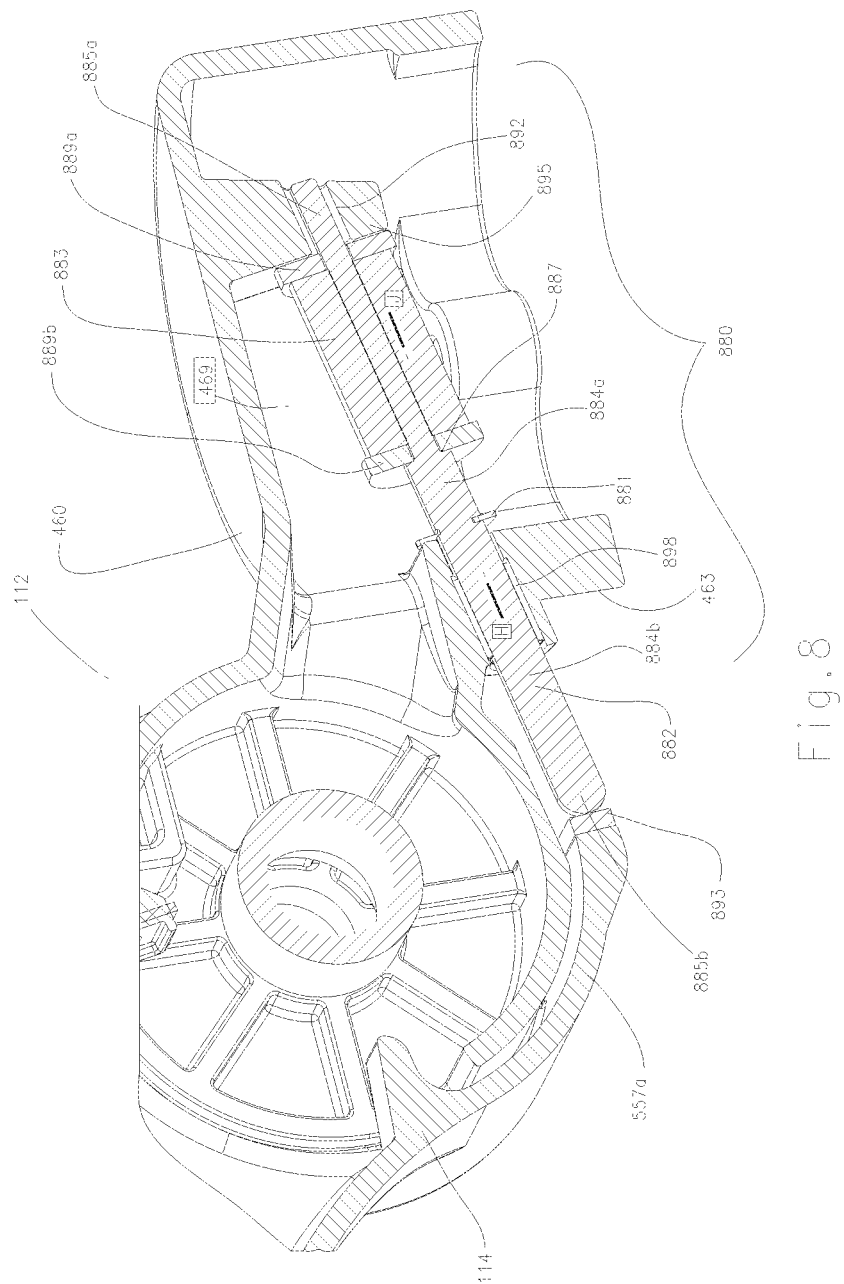
FIG. 8 is a cross-sectional, isometric view of the tiller coupled to a feedback mechanism configured in accordance with an embodiment of the present technology.

FIG. 8 is cross-sectional, isometric view of a portion of the tiller 112 coupled to a feedback mechanism 880 configured in accordance with an embodiment of the present technology. The feedback mechanism 880 includes a push rod 882 coupled to a biasing member, such as a compression member 883 (e.g., polyurethane spring), located within the cavity 469 of the mounting structure 460. A first portion 884*a* of the push rod 882 is inserted into the cavity 469 through an opening 898 in the base 463 of the mounting structure 460. The first portion 884*a* includes a tip region 885*a* that is inserted through the compression member 883 and into a slot 892 within the base 463. The push rod 882 also includes an integral abutment feature 887 that engages a first side 889*a* of the compression member 883. The compression member 883 has a second side 889*b* that engages an abutment feature 895 formed in the base 463 and adjacent to the slot 892 holding the tip region 885*a*. In some embodiments, a collar 881 can be positioned on a portion of the push rod 882 adjacent the opening 898 in the base 463 to hold the rod and the compression member 883 within the cavity 469.

As further shown in FIG. 8, a second portion 884*b* of the push rod 882 includes a tip region 885*b* that engages an abutment feature 893 on the first exterior sidewall 557*a* of the tiller arm 114. In operation, the abutment feature 893 pivots with the tiller arm 114 and pushes the push rod 882 in the direction of arrow H when it contacts the tip region 885*b* of the push rod 882. Further movement of the tiller arm 114 and the push rod 882 in the direction of arrow H compresses the compression member 883 between the abutment features 887 and 895. Compression of the compression member 883 provides a counteracting force on the push rod in the direction of arrow J. In some embodiments described below, the counteracting force provides haptic feedback to the operator when the brake 136 (FIG. 1B) is about to be applied.

FIGS. 9A and 9B are side views of the tiller 112 and a portion of the pallet truck 100 showing the tiller arm 114 and the handle 118 oriented in positions D and E, respectively, and FIGS. 10A and 10B are cross-sectional side views showing the feedback mechanism 880 in an engaged state and a disengaged state when the tiller arm is at positions D and E, respectively. Referring to FIGS. 9A and 10A together, the push rod 882 of the feedback mechanism 880 engages the tiller arm 114 when the tiller arm is pivoted away from a position D in a downward direction as shown by arrow G. In one aspect of this embodiment, the push rod 882 provides increased rotational resistance (e.g., haptic feedback) that alerts the operator that the pallet truck is on the verge of applying the brake. In a related aspect, alerting the operator can prevent inadvertent braking and abrupt stopping of the pallet truck 100, such as when the operator is carrying the handle 118 too low. In various embodiments, the feedback does not interfere with the ability of the pallet truck 100 to brake. In some embodiments, rotational resistance can increase as the operator continues to rotate the tiller arm 114 in the downward direction G (i.e., via further compression of the compression member 883).

Referring to FIGS. 9B and 10B together, the push rod 882 can disengage when the tiller arm 114 is pivoted away from position D in an upward direction opposite the downward direction, as shown by arrow K. For example, the push rod 882 can disengage when the tiller arm 114 is rotated upwardly away from position D in FIG. 9A into position E shown in FIG. 9B. In one aspect of this embodiment, the torsional springs 567 (FIG. 5A) of the pivot joint 135 FIG. 1B) can provide a biasing force throughout the entire range of motion of the tiller arm 114 (e.g., over the brake release range and the upper and lower braking regions), while the feedback mechanism 880 only provides a resistive force when the tiller arm 114 is in the vicinity of the lower braking region when moving in the downward direction G (FIG. 9A).

From the foregoing, it will be appreciated that specific embodiments of the disclosure have been described herein for purposes of illustration, but that various modifications may be made without deviating from the spirit and scope of the various embodiments of the disclosure. For example, while shown in the illustrated embodiment as being part of a separate cam member, the brake profile feature 570 (FIGS. 5A and 5B) can be formed directly on (e.g., integral with) with the pivot shaft 555 (FIG. 5A), and the cam member 575 (FIGS. 5A and 5B) may be omitted in some embodiments. In other embodiments, the brake profile feature 570 can be attached to a portion of the tiller arm 114 (FIG. 1B) other than the pivot shaft 555 and/or the brake release sensor 572 (FIGS. 5A and 5B) can be positioned in a different location and/or orientation within the pivot joint 135 (FIG. 1B). Further, while various advantages associated with certain embodiments of the disclosure have been described above in the context of those embodiments, other embodiments may also exhibit such advantages, and not all embodiments need necessarily exhibit such advantages to fall within the scope of the invention. Accordingly, the disclosure is not limited, except as by the appended claims.

We claim:
1. A pallet truck comprising:
   a drive wheel operably coupled to a steering assembly;
   a tiller operably coupled to the drive wheel, the tiller having a tiller arm that is pivotally coupled to the steering assembly such that the tiller arm is pivotable relative to the steering assembly between a braking region and a brake release region;
   a brake for stopping rotation of the drive wheel;
   a brake release sensor configured to output a signal that causes the brake to release when the tiller arm is in the brake release region; and
   a spring positioned such that, as the tiller arm is moved in a first direction from a first position in the brake release region to the braking region:
      the spring is not compressed by the movement of the tiller arm from the first position to a second position in the brake release region, the second position being closer to the braking region than is the first position; and the spring is compressed by the movement of the tiller arm from the second position to the braking region.

2. The pallet truck of claim 1, further comprising:
a pivot shaft that pivotally couples the tiller arm to the steering assembly;
a cam member fixedly coupled to the pivot shaft such that the cam member rotates with the pivot shaft as the tiller arm is pivoted relative to the steering assembly; and
a profile feature that is integrally formed in the cam member and is detectable by the brake release sensor;
wherein the brake release sensor is configured to output the signal when the profile feature is detected.

3. The pallet truck of claim 2 wherein the tiller includes a mounting structure fixedly coupled to the steering assembly and pivotally coupled to the tiller arm, wherein the brake release sensor is fixedly attached to the mounting structure.

4. The pallet truck of claim 3 further comprising first and second torsional springs over the cam member and biasedly coupling the pivot shaft to the mounting structure, wherein the profile feature is disposed medially between the first and second torsional springs.

5. The pallet truck of claim 2 wherein:
the tiller arm includes a first region fixedly coupled to the pivot shaft;
the tiller includes a second region fixedly coupled to the steering assembly and pivotally coupled to the first region via the pivot shaft; and
the first and second regions are configured to form an enclosure that encloses at least a portion of each of the brake release sensor and the profile feature.

6. The pallet truck of claim 2 wherein the profile feature includes a curved edge that is detectable by the brake release sensor, and wherein the curved edge has a length corresponding to the brake release region of the tiller arm.

7. The pallet truck of claim 1 wherein the brake release sensor includes a proximity sensor.

8. The pallet truck of claim 1, wherein the spring is a polyurethane spring.

9. A pallet truck comprising: a drive wheel operably coupled to a steering assembly;
a tiller operably coupled to the drive wheel, the tiller having a tiller arm and a pivot shaft pivotally coupling the tiller arm to the steering assembly;
a brake for stopping rotation of the drive wheel;
a brake release mechanism operably coupled to the brake, wherein the brake release mechanism is configured to (1) release the brake when the tiller arm is pivoted away from a first position toward a second position in a first direction and (2) apply the brake when the tiller arm is pivoted away from the second position toward a third position in the first direction; and
a spring coupled to the tiller, wherein the spring is configured to (1) engage when the tiller arm is pivoted away from the second position toward the third position in the first direction and (2) disengage when the tiller arm is pivoted away from the third position toward the second position in a second direction that is opposite to the first direction, wherein engagement of the spring resists pivoting of the tiller arm in the first direction.

10. The pallet truck of claim 9 wherein the spring is configured to completely disengage when the tiller arm is pivoted away from the third position in the second direction.

11. The pallet truck of claim 9, further comprising:
a biasing member configured to resist pivoting of the tiller arm in the first direction; and
a push rod coupled to the spring, the spring configured to urge the push rod into engagement with the tiller arm;

wherein:
the tiller includes a mounting structure fixedly coupled to the steering assembly and pivotally coupled to the tiller arm; and
the biasing member is configured to biasedly couple the tiller arm with the mounting structure.

12. The pallet truck of claim 9 wherein the spring is a polyurethane spring.

13. The pallet truck of claim 9 wherein the tiller includes a pivot shaft pivotally coupling the tiller arm to the steering assembly, and wherein the brake release mechanism further includes a profile feature fixedly coupled to the pivot shaft and a sensor positioned adjacent the pivot shaft to detect the profile feature as the tiller arm pivots, wherein the sensor is configured to output a signal that causes the brake to release when the profile feature is detected.

14. The pallet truck of claim 13 wherein:
the pallet truck further comprises a cam member fixedly coupled to the pivot shaft;
the profile feature is integrally formed in the cam member;
the tiller includes a mounting structure fixedly coupled to the steering assembly and pivotally coupled to the tiller arm; and
the sensor is fixedly attached to the mounting structure.

15. The pallet truck of claim 14 further comprising:
a biasing member configured to resist pivoting of the tiller arm in the first direction;
wherein the biasing member includes a torsional spring biasedly coupling the pivot shaft to the mounting structure.

16. The pallet truck of claim 13 wherein the profile feature includes a curved edge that is detectable by the sensor, and wherein the curved edge has a length corresponding to a brake release range of the tiller arm.

17. The pallet truck of claim 16 wherein the curved edge extends between a start position corresponding to an upper brake region, and a stop position corresponding to a lower brake region of the tiller.

18. The pallet truck of claim 13 wherein the sensor includes a proximity sensor.

19. A pallet truck comprising:
a drive wheel operably coupled to a steering assembly;
a tiller operably coupled to the drive wheel, the tiller having a tiller arm and a pivot shaft pivotally coupling the tiller arm to the steering assembly;
a brake for stopping rotation of the drive wheel; and
a spring coupled to the tiller, wherein the spring is configured to (1) engage when the tiller arm is pivoted away from a second position toward a third position in a first direction and (2) disengage when the tiller arm is pivoted away from the third position toward the second position in a second direction that is opposite to the first direction, wherein engagement of the spring resists pivoting of the tiller arm in the first direction.

20. The pallet truck of claim 19, wherein the spring provides rotational resistance to alert an operator when the pallet truck is about to apply the brake.

21. The pallet truck of claim 19, wherein the spring does not completely prevent a user from applying the brake.

22. The pallet truck of claim 20, wherein the rotational resistance is only applied when the tiller arm is pivoted away from the second position in the first direction.

23. The pallet truck of claim 19, wherein the spring is a polyurethane spring.

* * * * *